May 16, 1967             H. UNGRAD             3,320,481
DISTANCE PROTECTION FOR PARALLEL LINES IN NETWORKS WITH
GROUNDED NEUTRAL POINT AND COMPENSATION OF
THE NEUTRAL CURRENT
Filed June 1, 1964
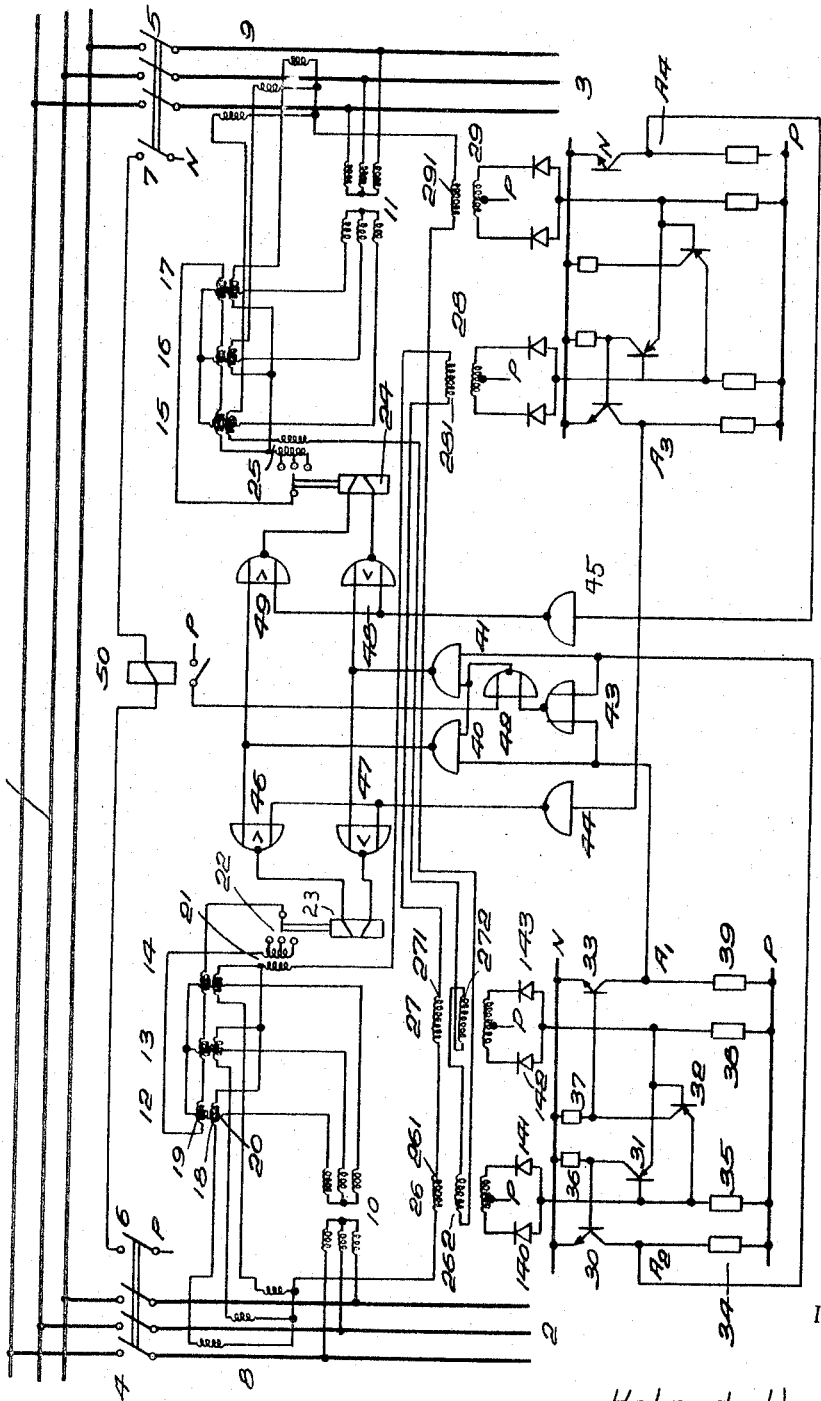
INVENTOR
Helmut Ungrad
BY Pierre, Scheffler & Parker
ATTORNEYS

United States Patent Office 3,320,481
Patented May 16, 1967

3,320,481
DISTANCE PROTECTION FOR PARALLEL LINES IN NETWORKS WITH GROUNDED NEUTRAL POINT AND COMPENSATION OF THE NEUTRAL CURRENT
Helmut Ungrad, Neuenhof, Switzerland, assignor to Aktiengesellschaft Brown, Boveri & Cie, Baden, Switzerland, a joint-stock company
Filed June 1, 1964, Ser. No. 371,475
Claims priority, application Switzerland, June 17, 1963, 7,488/63
7 Claims. (Cl. 317—36)

The present invention relates to a distance protection of parallel lines in networks with grounded Y point, where for the compensation of the differences between neutral, i.e. null impedances and co-impedances intermediate transformers are provided, to which the neutral current of the protected line is supplied.

In distance protection there is measured the magnitude of the impedance between the installation site of the protection and the fault. In the case of faults between the lines, this impedance is the conductor loop of the lines themselves. But in the case of a fault with ground contact, in particular in the case of a ground short-circuit, that is, a short-circuit between a conductor and ground, the impedance of the loop conductor-ground is the determining factor. This impedance, at equal fault location, is not equal to the impedance between the individual conductors themselves. Therefore, the distance protection must be so designed that in the case of a fault between the conductors and in the case of a ground short-circuit, the impedance is as nearly equal as possible. This, as is known, is done by supplying to the distance protection the voltage at the installation site of the distance protection and the current in the conductors. The ratio of both furnishes the impedance. Now if the impedance of the loop conductor-ground and the impedance of the loop between the conductors are different, the same impedance will not result in the two cases. To compensate this error, one additionally supplies to the distance protection the neutral current which results from the sum of all phase currents. The effect of this neutral current can be so proportioned that the difference between the magnitude of the co-impedance and of the neutral impedances is compensated.

On single lines a distance protection is thereby obtained which functions satisfactorily in all cases of faults. With double lines, however, difficulties arise. The neutral currents of both lines, in fact, influence each other, even if only one line has a fault. Also, for the protection of the sound line a fault is simulated, since neutral current now flows also through the relay. This may give rise to false measurements. In particular, different ratios result depending on whether only one line is in operation or both lines are in operation. The different distribution of the neutral current depends also on the position of the fault. Therefore, a simple compensation is not sufficient, as this lets the neutral current act on the distance protection by a proportionality factor $k$ which must be made dependent on the various fault locations and on the circuit state of the lines.

Several solutions have become known for eliminating this difficulty. Thus, one has introduced into the relay also the neutral current of the parallel line. Therefore, one compensates not only by the neutral current of the line itself, i.e. the line which the distance protection is to protect, but also by the neutral current of the parallel line. It, too, is supplied in a certain ratio. This ratio is determined so that in case of a ground short-circuit on the double line the relay measures as nearly as possible the same impedance as in case of a ground short-circuit on a line in operation alone. With this circuit arrangement, however, also the protection of the sound line is affected, leading to false measurements of these relays. Especially for faults in the vicinity of the installation site, this false compensation is noticeable, as there the neutral current between fault and installation site is supplied, but not the current which actually flows on the line as neutral current.

It has also been proposed to provide additionally direction relays and current difference relays, which connect the compensation current only when the neutral current of the parallel line reaches a certain value. But also this measure still results in difficulties in some cases, as can be demonstrated. This is the case in particular when one of the two lines is fed only unilaterally and at the end a ground short-circuit occurs. Another fact with this measure is that there must be supplied to the relay, a current which does not belong to its own circuit. This involves a mingling of the currents, which one experienced in this field is disinclined to accept.

To avoid these shortcomings and to render possible a really satisfactory performance, and also to be able to completely separate in a galvanic manner the currents of the individual current transformers, it is now proposed according to the invention to provide a switching device which switches taps at the intermediate transformer for the compensation of the neutral current as a function of the direction and magnitude in the line parallel to the protected line, and as a function of the circuit state of the parallel line.

The switching may be effected in two ways; either the compensation is increased or it is decreased. For this, certain conditions may be derived, which are summarized in the following:

The compensation must be increased when the neutral current in the line parallel to the defective line has the same direction as the current in the defective line and is equal or smaller than the latter.

It must be decreased when the neutral current in the parallel line is of the opposite direction and is equal or smaller than the neutral current in the defective line; also, when the switch of the parallel line is triggered by the respective relay and when the parallel line is disconnected and grounded at two points.

There must be no switching when the neutral current in the parallel circuit is codirectional and greater than the neutral current in the defective line; also, when the two lines are not connected in parallel on one side.

The annexed figure which is a schematic electrical diagram shows an example of this construction:

From the bus bar 1 two parallel, 3-phase lines 2 and 3 originate, each of which is provided with a power switch 4 and 5 for connection to the 3-phase bus. The power switches have auxiliary contacts 6 and 7. It should be pointed out that normally double bus bar systems are present, which are not shown only for the sake of simplicity. The entire arrangement applies also to double bus bar systems, in which case also the respective cutout switches must have auxiliary contacts. In the path of lines 2 and 3 are located the current transformers 8 and 9. In addition, the voltage transformers 10 and 11 are connected to the line. The transformers feed the diagrammatically shown distance relays 12 to 17. The distance relays are simply represented by coils, but they may be replaced in known manner by rectifier bridge connections or by transistorized circuit arrangements. The coils are so represented that it is seen that they are to act together. Two current coils are shown, through one of which, 18, there passes at the distance relay 12 the current of the respective conductor, and through the other, 19, the summation current, while at coil 20 the respective voltage is applied. The known switchovers which have to be carried out depending on the type of fault have been omitted for the sake of clearness. The neutral current for line 2 is formed as summation current of the transformers 8, namely, through the intermediate transformer 21. The primary winding of this transformer receives current from all three current transformers 8 and the secondary winding of this transformer which supplies neutral summation current to winding 19 on each of the distance relays 12–14, has three taps, which can be switched by means of the relay contact 22. At the highest tap the neutral current has the least effect on the distance relay, at the lowest, the greatest effect. Contact 22 is actuated by relay 23, which can switch the contact to the upper or lower terminal, depending on its excitation. Relay 23 has two oppositely directed windings. The same neutral summation current arrangement is provided for line 3 by way of relay 24 and intermediate transformer 25 whose primary winding is fed by the currents of all three current transformers 9 in 3-phase line 3 and whose tapped secondary supplies windings 19 on the distance relays 15–17. The relays may, of course, be replaced in known manner by an electric arrangement. Now the switching must be effected according to the above-stated conditions. This is done by the remaining arrangement. This latter arrangement is fed by the auxiliary transformers 26 to 29. The section fed by the auxiliary transformers 26 and 27 constitutes a transistorized directional relay; the section fed by the auxiliary transformers 28 and 29, a differential member which compares the quantities. What is supplied to the auxiliary transformers is the neutral current of lines 2 and 3. In windings 261, 271 and 281 there flows the neutral current of line 2; in lines 262, 272 and 291, the neutral current of line 3. The transformer 26 forms magnetically the sum of the two neutral currents and transformer 27 forms the difference. It is known that by joint action of the sum and the difference of two quantities its direction can be established. The two transformers 28 and 29 together form a differential relay, which measures the difference of the quantities of the two neutral currents. Now the arrangement of the transistors 30 to 33 with the resistances 34 to 39, and with the rectifiers 140 to 143 is such that at location $A_1$ a negative signal appears when the neutral currents of the two lines have oposite directions, and at location $A_2$ a negative signal when the two currents are codirectional. Depending on the relative direction of the currents, therefore, a negative signal appears at location $A_1$ or $A_2$. P and N are the respective D.C. voltages for the transistors. The negative signals are here produced in the following manner:

If the neutral currents are cophasal, the current in transformer 26 is greater than in transformer 27. Owing to this the voltage drop through resistance 35 is greater than that through resistance 38, so that the transistors 30 and 31 conduct. This renders point $A_2$ negative. But if the neutral currents are oppositely directed, the current in the secondary winding of transformer 27 is greater, so that the transistors 32 and 33 conduct and a negative signal appears at point $A_1$.

The arrangement is similar with the transformers 28 and 29, which compare the magnitude of the two neutral currents. If the neutral current of line 2 is greater than that of line 3, a negative signal appears at point $A_3$, whereas, if the current of line 3 is greater than that of line 2, a negative signal appears at point $A_4$. The connection of the transistorized arrangement in the differential relay is the same as in the directional relay and therefore need not be described in detail.

Now depending on the occurrence of the signals $A_1$ to $A_4$ the desired operation of relays 23 and 24 is obtained. This is accomplished through the use of logic circuits and will be described in the following:

The signals $A_1$ and $A_2$, that is, the signals which come from the directional relay, are supplied to the digital components 40 and 41. These are "AND" members with reversal of the sign. They compare the signals $A_1$ and $A_2$, as well as a signal which comes from the digital component 42 and constitutes a "NOR" element. In it the circuit state of the lines is compared with the output of the NOR element 43, which in turn has had supplied to it the quantities $A_1$ and $A_2$. The output signals $A_3$ and $A_4$ are supplied to the inverters 44 and 45 and are then compared in the NOR elements 46, 47, 48 and 49 with the outputs of the digital elements 40 and 41. These NOR elements supply the signals for the relays 23 and 24, the lower winding of each relay being energized when the influence of the neutral current is to be increased, that is, contact 22 is pulled down, and the upper winding of each relay being energized by the elements 46 and 49, contact 22 being pushed up.

The mode of operation may be understood with reference to the example in the case where the two neutral currents are oppositely directed in the two lines and the neutral current in line 3 is smaller than the neutral current in line 2. This takes place when a fault exists on line 2. In this case, relay 23 should shift contact 22 so that the neutral current compensation is decreased. The upper winding, therefore, must be energized to reduce the number of turns and hence reduce the voltage induced in the secondary of the intermediate transformer 21. As the currents are oppositely directed, a signal occurs at point $A_1$. As the current in line 3 is smaller than in line 2, another signal occurs at point $A_3$. Both signals are negative, that is, they are conventionally designated by the binary figure "1." A corresponding positive signal is designated by "0." Signal $A_3$ is fed to the inverter 44, where signal "1" is transformed into a signal "0." Therefore, there appears at the NOR element 47 the signal "0" on the lower line. Signal $A_1$, also a "1" signal, is fed to the AND element 40 and there appears as a "1" signal, Further, there is fed to this signal the output of the NOR element 42. There is formed at this output a "1" signal, as is evident from the following consideration:

At the NOR element 43 appears the signal $A_1$, that is, the "1" signal and the signal $A_2$, which in reality does not exist, that is, an "0" signal. At a NOR element, the group "1, 0" forms an output signal "0." This signal "0" is then supplied to the additional NOR element 42, at which the circuit state is compared with the output signal of the NOR element 43. The circuit state is determined by relay 50. If both switches 5 and 4 are connected, also the auxiliary contacts 6 and 7 are closed, relay 50 is energized through these contacts and closes its contact. Thereby a positive signal, that is, an "0" signal is given to element 42. In this case, therefore, two "neutral" (null) signals appear, a "1" signal being formed at this element at the output. Owing to this, as has been said, two "1" signals are formed at element 40. This means at the output an "0" signal. Thereby element 46 receives at total of two "0" signals, owing to which a "1" signal is formed at its output and the upper winding of relay 23 is energized. Thereby the switch of contact 22 takes place in the desired sense.

At element 47 are supplied the signals "0" and "1," so that an "0" signal is formed at the output and the lower winding is not energized. At elements 48 and 49 also no output signal is formed, as can easily be derived.

In similar manner, the signals are produced when other fault conditions and circuit states exist. This is not explained in detail as the train of thought is the same as in the described construction.

As the entire arrangement consists only of electronic elements, the response time is extremely small. It is, as could be demonstrated, less than 5 ms.

The advantage of this arrangement is that for double lines a satisfactory functioning of the distance protection is possible in all circuit states and in all cases of faults, also when using systems without independent directional members. Besides, the advantage is obtained that the circuits of the transformers 8 and 9 remain galvanically separated from each other and therefore mutual influence is not possible. It is also to be pointed out that the entire arrangement is, of course, provided on both sides of the line, and that it functions correctly also when the circuit state is different on both sides, the lines being, for example, connected together on one side and remaining separated on the other side.

I claim:

1. In a distance protection relay arrangement for a plurality of parallel connected multi-phase feeder lines in networks with grounded neutral point which comprises distance relay means connected respectively to the phases of each said feeder line, said distance relays including a composite control based upon phase current, phase voltage and the neutral current of the respective feeder line, the improvement wherein means included in said distance relay means for each feeder line and which reflects the neutral current of that line is supplied with current from the secondary of an intermediate transformer and whose primary is fed with the neutral current of the feeder line, said transformer secondary being provided with taps thereon for adjusting the secondary current, means comparing said neutral currents in said paralleled feeder lines and providing a first set of control signals reflecting the relative directions of said neutral currents, means comparing the respective magnitudes of said neutral currents and providing a second set of control signals reflecting the sense of the difference therebetween, and means controlled by said sets of signals for selectively changing the taps on the secondaries of said intermediate transformers.

2. A distance protection relay arrangement as defined in claim 1 wherein said means comparing said neutral currents in said paralleled feeder lines to provide said first set of control signals reflecting the relative directions of said neutral currents is comprised of a pair of transformers in one of which is established the sum of said neutral currents and in the other of which is established the difference between said neutral currents.

3. A distance protection relay arrangement as defined in claim 2 wherein a pair of interconnected transistorized circuits are connected to the secondary windings of said transformers, one of said circuits being rendered conductive to establish a control signal of said first set when said neutral currents have the same direction and the other said circuit being rendered conductive to establish the other control signal of said first set when said neutral currents are of opposite direction.

4. A distance protection relay arrangement as defined in claim 3 and which includes a logic circuit connected to said transistorized circuits and which extends to said tap changing means.

5. A distance protection relay arrangement as defined in claim 1 wherein said means comparing the respective magnitudes of said neutral currents in said paralleled feeder lines to provide said second set of signals reflecting the sense of the difference therebetween is comprised of a pair of transformers the primary windings of which are fed respectively with said neutral currents, and a pair of interconnected transistorized circuits connected to the secondary windings of said transformers, said transistorized circuits being rendered alternatively conductive to establish respectively the control signals of said second set in dependence upon sense of the difference of the compared currents.

6. A distance protection relay arrangement as defined in claim 5 and which includes a logic circuit connected to said transistorized circuit and which extends to said tap changing means.

7. A distance protection relay arrangement as defined in claim 1 wherein each of said feeder lines is connected to a bus bar through a power switch, and which further includes means for adjusting said taps on said secondaries of said intermediate transformers and which are responsive in a manner dependent upon the positions of said power switches, said taps being changed in the direction to decrease the neutral current effect in said distance relay means when both of said power switches are closed.

References Cited by the Examiner

UNITED STATES PATENTS 2,902,625 9/1959 Dewey _____ 317—36
2,971,131 2/1961 Goff _____ 317—36

MILTON O. HIRSHFIELD, *Primary Examiner.*

R. V. LUPO, *Assistant Examiner.*